United States Patent
Baloch et al.

(10) Patent No.: US 6,459,974 B1
(45) Date of Patent: Oct. 1, 2002

(54) RULES-BASED OCCUPANT CLASSIFICATION SYSTEM FOR AIRBAG DEPLOYMENT

(75) Inventors: Aijaz Ahmed Baloch, Newton, MA (US); Usman Ahmed; Muhammad Asif, both of Lahore (PK); Khurram Khan Afridi, Woburn, MA (US)

(73) Assignee: Eaton Corporation, Cleveland, OH (US)

( * ) Notice: Subject to any disclaimer, the term of this patent is extended or adjusted under 35 U.S.C. 154(b) by 0 days.

(21) Appl. No.: 09/870,151

(22) Filed: May 30, 2001

(51) Int. Cl.$^7$ ................................................ G06F 7/00
(52) U.S. Cl. ......................... 701/45; 701/47; 180/271; 280/735
(58) Field of Search ..................... 701/45, 47; 180/271, 180/272; 280/734, 735

(56) References Cited

U.S. PATENT DOCUMENTS

| | | |
|---|---|---|
| 5,074,583 A | 12/1991 | Fujita et al. |
| 5,366,241 A | 11/1994 | Kithil |
| 5,398,185 A | 3/1995 | Omura |
| 5,413,378 A | 5/1995 | Steffens, Jr. et al. |
| 5,446,661 A | 8/1995 | Gioutsos et al. |
| 5,490,069 A | 2/1996 | Gioutsos et al. |
| 5,890,085 A * | 3/1999 | Corrado et al. ............... 701/47 |
| 5,983,147 A | 11/1999 | Krumm |
| 6,005,958 A | 12/1999 | Farmer et al. |
| 6,026,340 A * | 2/2000 | Corrado et al. ............... 701/47 |
| 6,272,411 B1 * | 8/2001 | Corrado et al. ............... 701/45 |

* cited by examiner

Primary Examiner—Gertrude Arthur
(74) Attorney, Agent, or Firm—Rader, Fishman & Grauer PLLC (57) ABSTRACT

An occupant classification system utilizes a rules-based expert system to automatically classify the occupant of a seat for the purposes of airbag deployment. The invention provides users with the ability to create, test, and modify the image attributes or "features" used by the expert system to classify occupants into one of several predefined occupant-type categories. Users are also provided the ability to create, test, and modify the processes utilizing those chosen features. The user of the invention designs the features and the algorithms used by the expert system classifier. A feature extractor is used to extract features from an image of the occupant and surrounding seat area, and the values relating to those features are sent in a vector of features to the expert system classifier. The expert system classifier classifies the image of the occupant according to the internal rules for that classifier. The resulting occupant-type classification is sent to the confidence factor extractor, along with the vector of features. The confidence factor extractor generates a confidence factor indicating the probable accuracy of the occupant-type classification. The occupant-type classification and confidence factor are then sent to the airbag controller so the airbag deployment system can take the appropriate action. For embodiments involving multiple expert system classifiers, one weighted occupant-type classification and one weighted confidence factor are sent to the airbag controller.

48 Claims, 6 Drawing Sheets

RULES-BASED OCCUPANT CLASSIFICATION SYSTEM FOR AIRBAG DEPLOYMENT

BACKGROUND OF THE INVENTION

The present invention relates in general to systems used to determine information about the type of occupant in a seat. In particular, the present invention uses a rules-based expert system to classify the occupant of a seat into one of several predefined occupant-type classifications so that an airbag deployment system can make the appropriate adjustment with respect to airbag deployment.

Conventional airbag deployment systems have contributed significantly to the safety of occupants in automobile crashes. However, there may be occasions when due to the particular type of occupant in a particular seat, the deployment of an airbag may not be desirable. This may be true even though airbag deployments generally provide substantial safety benefits. Presently, there are manual devices that allow the occupants of an automobile to disable an airbag deployment system. These devices depend on an occupant to remember that the deployment status of the airbag may need to be changed, examine the current status of the airbag deployment system, and decide on the basis of the type of occupant whether or not the deployment system should be enabled or disabled. Ultimately, manual systems are less desirable than automated systems for airbag disablement because the determination of whether an airbag should be disabled can be objectively determined, and is substantially a function of the type of occupant sitting in the seat behind the airbag. It would be desirable for a system to automatically determine whether an airbag should be disabled on the basis of the type of occupant sitting in the seat behind the airbag.

Known automated systems suffer from substantial limitations. One system relies on occupants to carry a data card which needs to be inserted into a scanning system on every trip. Such a system does not provide guest riders with desired protection since a guest rider has no reason to possess such a card. Moreover, the inconvenience to regular riders of a vehicle will still likely impede use of such a system. It would be highly desirable for an occupant classification system to function accurately without any need for affirmative cooperation from the occupant.

Some existing systems rely on weight sensors in the seat to determine the type of occupant in a seat. Weight-based systems suffer from inaccurate weight measurements because the movement of an automobile causes the weight in a seat to shift, and thus makes weight difficult to measure accurately. Moreover, a weight sensor cannot distinguish between a 70 pound child and a 70 pound inanimate object. It would be desirable for an occupant classification system to be based on non-weight based characteristics of the occupant.

It is known that optic sensors can determine the distance between the occupant at certain locations in the seat, and the airbag. Such systems may be superior to weight-based systems, and some hybrid systems may even utilize both weight-based sensor data and optically-based sensor data. Although the attribute of distance between the occupant and the airbag may be a useful attribute to consider in making an occupant-type classification, there are limits to relying solely on position-based data. It would be desirable if even dynamic systems such as those systems monitoring the ever changing position of the occupant, would also incorporate intelligence regarding the visual image of the occupant. It would be highly desirable for an airbag deployment system to know the classification of the occupant based on the image attributes of the occupant.

It is known in the prior art that a visual image taken by a camera, instead of mere data points captured by an optical scanner, can be used to determine whether or not an airbag system should be disabled. However, such systems make an airbag disablement decision by attempting to match the then current occupant image to one of many template images, with each template image associated with a particular airbag deployment decision. In some cases, the template image may even be associated with a predefined occupant classification type that then in turn, determines the particular airbag deployment decision.

Such template-based methodologies suffer from several limitations originating from the number of template images needed to match a voluminous number of potential situations. Occupants sit differently from one another, move differently, drink beverages, eat food, talk on cell phones, and actively pursue all sorts of different behaviors while in automobile seats. The sheer volume of potential variations makes holistic matching a tedious and ultimately inaccurate process because many of the variations are not relevant to the airbag deployment decision, and will only serve as white noise for the template-based system, preventing an inaccurate assessment of the occupant. Resource constraints are also an important limitation, because ultimately all processing will be performed by a small on-board computer. Similarly, performance constraints associated with comparing an occupant image to thousands or more template images are important consideration for a system required to perform its function in fractions of a second. In summary, holistic template-based matching approaches spend too much time and resources being confused by image attributes not likely to be relevant to determining whether or not an airbag should be precluded from deploying. It would be highly desirable if a more focused approach were used, an approach based on the proven predictive value of a particular feature or set of features.

Due to these limitations, it would be desirable for a library of key occupant image attributes ("features") be used to classify the occupant. It would be advantageous for an occupant classification system to isolate key features instead of being distracted or even misled by the distractions of extraneous "white noise" images attributes not relevant to a occupant classification decision. Such key features could then be tested for their predictive value with respect to distinguishing between particular occupant types. It would be helpful to construct algorithms utilizing only those features most helpful in an occupant-type classification decision. It would also be desirable for an expert system to implement such algorithms in a timely and automated way. If multiple features were to be utilized to generate a single weighted classification type, it would be desirable for a single weighted confidence factor to be generated for the single weighted classification determination. It would also be desirable for a system to utilize a sufficient number of predefined and comprehensive occupant classification types in order to for the airbag deployment system to make well-informed decisions. Such a system should be able to distinguish between an adult, a rear facing infant seat, a front facing child seat, a booster seat, a child (between 6 and 8 years old), miscellaneous occupants (such as inanimate objects) and indeterminate occupants (none of the previous categories). The use of fewer classification types is undesirable because it impedes the ability to isolate, develop, and key features for use by an expert system classification system.

One final problem common to all occupant classification systems used by airbag deployment systems is the question of accuracy, and how to deal with the inevitable inaccurate determination. Although the goal of such systems is to be as accurate at possible, no system is perfect, and current systems do not provide any means by which the airbag deployment system can weigh the accuracy of a classification made by the occupant classification system. The decision to deploy or disable an airbag should incorporate the probability that an occupant-type classification was accurately made. Thus, it would be helpful if each occupant-type classification were accompanied by a confidence factor indicating the relative accuracy of the occupant-type classification. It would be desirable is such a confidence factor could in part be generated from test results using known images of potential occupants.

SUMMARY OF THE INVENTION

The present invention relates to a occupant classification system that utilizes a rules-based expert system to categorize the occupant of a seat into one of several predefined occupant-type categories on the basis of key image attributes ("features") of the occupant. The occupant classification system then uses a confidence factor extractor to generate a confidence factor associated with the occupant-type classification with a higher confidence factor indicating greater likelihood that a particular classification is correct. Both the occupant-type classification and the associated confidence factor are sent to the airbag controller so that the appropriate steps may be taken with regard to the behavior of the airbag.

Use of the occupant classification system requires that a camera capture the image of the occupant. A feature extractor takes the image captured by the camera, and then extracts the key features of the occupant. A vector of features relating to the visual image of the seat area in a vehicle such as an automobile, plane, train, or boat, and classifies the occupant of that seat into one of several predefined classification categories. Inputs to the inventive system could include the surrounding image of the entire seat area (the "ambient image"), the image of the occupant (the "segmented image") without the image of the environment surrounding the occupant, or simply a vector of features containing information regarding the segmented image or the ambient image. For embodiments where the inputs are the segmented image or the ambient image, the invention contains a feature extractor to extract a vector of features from those images.

Users of the invention can create new features, derive new features from existing features, and test the effectiveness of particular features and particular combinations of features with respect to distinguishing between particular occupant-type classifications. The opportunity to further refine such features and sets of features is a substantial advantage of the invention. This flexibility provides users of the invention with the opportunity to maximize the accuracy of occupant-type classification determinations. Focusing on the key features that are particularly successful at distinguishing between particular occupant classification types facilitates timely and accurate classification determinations, while minimizing resource requirements for the classification system through heightened efficiency.

The present invention also includes a method for determining whether or not a particular feature should be included in a library of features used by an expert system classifier. A set of features can be tested for their aggregate accuracy in correctly predicting occupant-types using an expert system classifier ("resource classifier"). Subsequent to testing the aggregate accuracy of the resource classifier, individual features can be removed from the resource classifier, and those results can be compared with the test results from the resource classifier to determine if that feature that was removed was advantageous or disadvantageous to the resource classifier. Each test feature is then put back in the library of features, and a new feature is then removed for testing until each feature in the resource classifier has been similarly tested by that features isolated removal. This methodology is beneficial because it provides a way to evaluate the effectiveness of each feature with respect to the overall effectiveness of a set of features. The inventive process allows users to choose the most effective features for expert system processing.

The present invention also provides users with the ability to create, test, and refine expert system decision trees utilizing their library of features. Such decision trees contain different branches based on different values of selected key features. Ultimately, all branches on the decision tree end with an occupant-type classification determination. The occupant-type classification, along with the vector of features, is sent to the confidence factor extractor. The confidence factor extractor uses both the occupant-type classification and the vector of features to generate a confidence factor number representing the probability that the classification determination is accurate.

The ability to generate a confidence factor indicating the probability that a particular classification determination is accurate is also a substantial advantage of the present invention. A confidence factor is mathematically derived from testing data obtained from the particular expert system classifier with its particular algorithm and set of features. A confidence factor is generated both through experimental test data and analytical means.

The invention is intended to maximize the potential benefits of what is referred to in the statistical arts as data mining. A single expert system classifier can implement a decision tree utilizing numerous different features. The invention can contain numerous expert system classifiers, with each expert system classifier utilizing multiple features. In all multiple-expert system embodiments of the invention, a weighted class predictor and confidence factor extractor are used to generate one overall classification determination, and one confidence factor relating to that overall determination. In a multiple expert system embodiment, each expert system could use identical feature sets, mutually exclusive features sets, or feature sets with some overlap in relation to other expert system classifiers.

Various additional advantages and features of this invention will become apparent to those skilled in the art from the following detailed description of the preferred embodiment, when read in light of the accompanying drawings.

DETAILED DESCRIPTION OF THE PREFERRED EMBODIMENT

Figure 1:
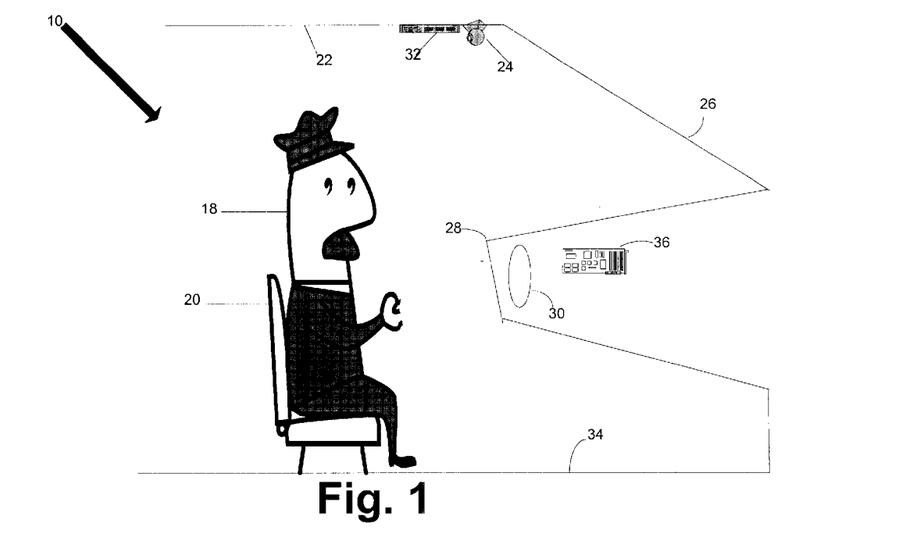
FIG. 1 shows the setting of the occupant classification system, and various environmental elements involved in the use of the invention.

Referring now to the drawings, illustrated in FIG. 1 is partial view of the surrounding environment for one embodiment of an occupant classifier system 10. If an occupant 18 is present, the occupant sits on a seat 20. In the preferred embodiment, a camera 24 is attached above and in front of the occupant 18 in a roof liner 22 of a vehicle such as an automobile. There are many potential locations for a camera 24 that are well known in the prior art For example, the camera could be attached to a rear-view mirror or near the point where the roof liner 22 intersects with a front windshield 26. A computer system 32 including embedded software may be located at virtually any location in or on a vehicle. In the preferred embodiment, the computer system 32 is located near the camera 24 to avoid sending camera images though long wires. An airbag controller 36 is shown in the instrument panel 28, although the present invention may function regardless of the location of the airbag controller 36. Similarly, an airbag deployment system 30 is also located in the instrument panel 28, but the present invention could still function even if the airbag deployment system 30 was located in a different environment.

Figure 2:
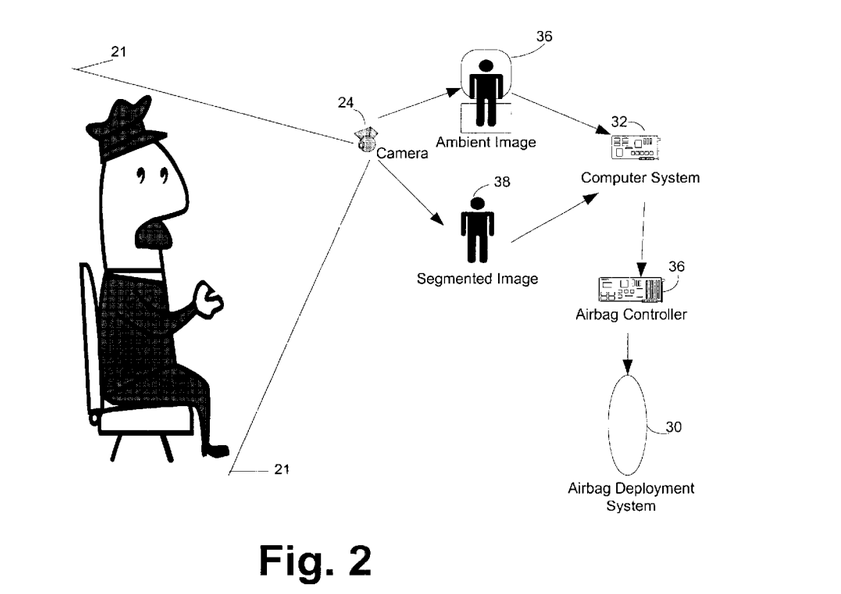
FIG. 2 shows a high-level process flow utilizing the invention.

FIG. 2 discloses the basic process flow surrounding the use of the occupant classifier system 10. An image of a seat area 21 including both the occupant 18 and the seat 20 is captured by the video camera 24. In the figure, the seat area 21 includes the entire occupant, although under some circumstances it may include only a portion, particularly if the camera 24 is positioned in a location where the lower extremities may not be viewable. It is well known in the art how embedded computer software can generate a "segmented image" 38 (the image of the occupant in isolation from the surrounding environment) from the more comprehensive "ambient image" 36 (the image of the occupant 18 and the surrounding seat area 21 ). The camera 24 could be an analog video camera, a digital video camera, or any other type of optical sensor capable of capturing an ambient image 36 of a seat area from a which a segmented image 38 (an image of solely the occupant 18 with the surrounding area removed) may be generated. The software to generate a segmented image 38 can either exist in the camera 24 itself, the computer system 32 itself, or in the form of an additional computer system with embedded software between the camera 24 and the computer system 32. In the preferred embodiment, extraction of the segmented image is done in the computer system itself 32. In FIG. 2, the camera 24 extracts the occupant's segmented image 36 and sends the segmented image to the computer system 32.

In FIG. 2, the computer system 32 receives the ambient image 36 of the seat area and the segmented image 38 of the occupant 18 as inputs. The output of the computer system 32 is sent to the airbag controller 36 which then determines on the basis of the occupant-type classification determination by occupant classifier system 32, whether or not the airbag deployment system 30 should be disabled, enabled, or enabled in a modified way, such as by decreasing the pressure used to inflate the airbag.

Figure 3:
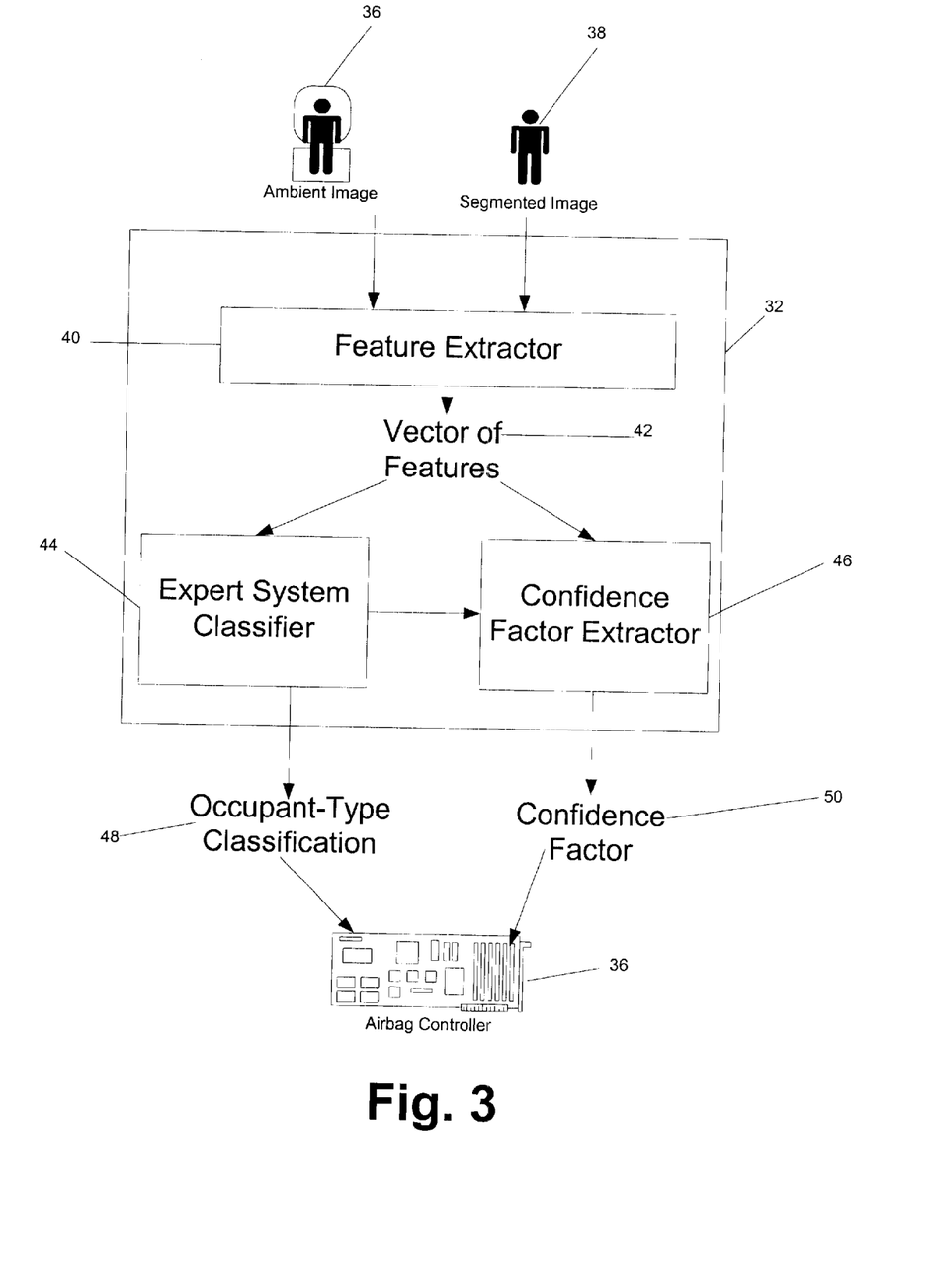
FIG. 3 is the block diagram for an implementation of a rule-based occupant classifier.

Referring now to the internal processes of the computer system 32 comprising the occupant classifier system 10, illustrated in FIG. 3 is a block diagram for a computer system 32 utilizing a single expert system classifier 44. The ambient image 36 and the segmented image 38 are the only two inputs for the computer system 32 embodied in FIG. 3. The preferred embodiment uses both images, although alternative embodiments may function with only an ambient image 36 or only a segmented image 38. Use of only one of the two images will result in a reduction in the number of key image attributes ("features+) that can be utilized to distinguish between two or more different occupant classification-types.

Image Attributes or "Features"

A feature extractor 40 extracts a vector of features 42 from the ambient image 36 and the segmented image 38. The ability to use embedded software to extract a vector of features 42 is well known in the art. In the preferred embodiment as disclosed in FIG. 3, the feature extractor 40 is a subsystem in the computer system 32. However, the feature extractor 40 could be embodied as a computer program in the video camera 24 or embedded software on a separate computer system located between the computer system 32 and the computer system that extracts the segmented image 38 from the ambient image 36. The vector of features 42 is a series of numerical values with each value relating to a particular image attribute or "feature."

Many features that are potentially useful for the computer system 32 in the occupant classifier system 10 are already known in the art or could be easily derived under existing art. If a feature may be represented by a quantitative value, it can serve as a feature for the occupant classifier system 10. Some features are simple distance measurements, such as the height of the occupant in the segmented image or the width of the occupant in the segmented image. For example, the height of the occupant could be 258 pixels in which case 258 would be a value of that particular feature. In such an example, the vector of features 42 would contain a value of 258 representing the height of the occupant in the segmented image. Other features are positional, such as the horizontal location of the lowest point of the occupant in the segmented image or the vertical location of the right most point of the occupant in the segmented image. For example, if the x-y coordinates for the right most point of the occupant are (30, 80), then the vertical location at that point is 80, and the value of 80 is inserted into the vector of features 42 for that particular feature. Features need not be limited to direct measurements of the occupant. The angle between the major axis of an ellipse and the horizontal axis when the segmented image 38 is mapped to an ellipse is a potential feature, and such a feature could be a numerical value in degrees or radians. Still other features are the result of mathematical manipulations applied to already known features. For example, the x and y coordinate for each "on" pixel (each pixel which indicates some type of occupant) could be multiplied together, and the average product for all "on" pixels would constitute a feature. The average product for the value of the x coordinate squared and the value of the y coordinate squared is also a potential feature.

A key advantage of the present invention is that it specifically anticipates that users of the invention will create new features. The greater the number of potentially useful features at the disposal of an expert system classifier 44, the greater the potential accuracy of an occupant-type classification 48. Thus, the ability to derive new features from already known features is beneficial with respect to the practice of the invention. The present invention specifically provides ways to derive new additional features from those already existing features.

One way to create new features is through the permutation of two or more existing features. The summation of two or more features, the value of one feature subtracted from another feature, the value of one feature multiplied by the value of another feature, or the ratio of two or more features, are all ways to generate new features through the permutation of existing features. For example, the ratio of the height to width may be utilized as a distinct feature.

Mean reference features are another form of derivative features. Mean reference features compare an existing feature to the mean value of that feature for a particular classification type as observed in a series of test images. For example, if the mean height for an adult occupant is 400 pixels, and the height of the current occupant is 418 pixels, then the difference between the two measures may constitute a new feature. In the example, a value of 18 would be inserted into the vector of features 42. Mean reference features provide a useful mechanism for incorporating the results of test data where the occupants being tested are of a known classification type. Mean reference features can also be derived by using the ratio between two features. In the above example of an occupant 418 pixels in height and an average adult height of 400 pixels, the ratio of the current occupant's height to the mean value for adult would be 418/400, or 1.045. Conversely, the ratio of mean value to the feature value ("FV+) of the current occupant would be 400/418, or 0.956938.

Trigonometric manipulations to existing features also provide a potentially bountiful source of additional derivative features. For example, instead of utilizing the area in pixels of the occupant in the segmented image, the sin, cosine, or tangent of that area could be used as a feature. Trigonometric, permutation, and mean reference features may all be included in the vector of features 42. Derived features such as trigonometric, permutation, and mean features can themselves be derived from previously derived features. Thus, the potential number of derived features is virtually limitless. In the preferred embodiment of the invention, there will be multiple features used by the expert system classifier 44 and thus the vector of features 42 would contain values for more than one feature. For example, a vector of features for an expert system classifier 44 expecting to receive the height of the occupant (320 pixels for example), the width of an occupant (760 pixels for example), and angle between major axis and horizontal axis when the segmented image is mapped to an ellipse (60 degrees for example), the vector of features would be as follows: <320. 760, 60>.

Methodology for Feature Selection

Figure 6:
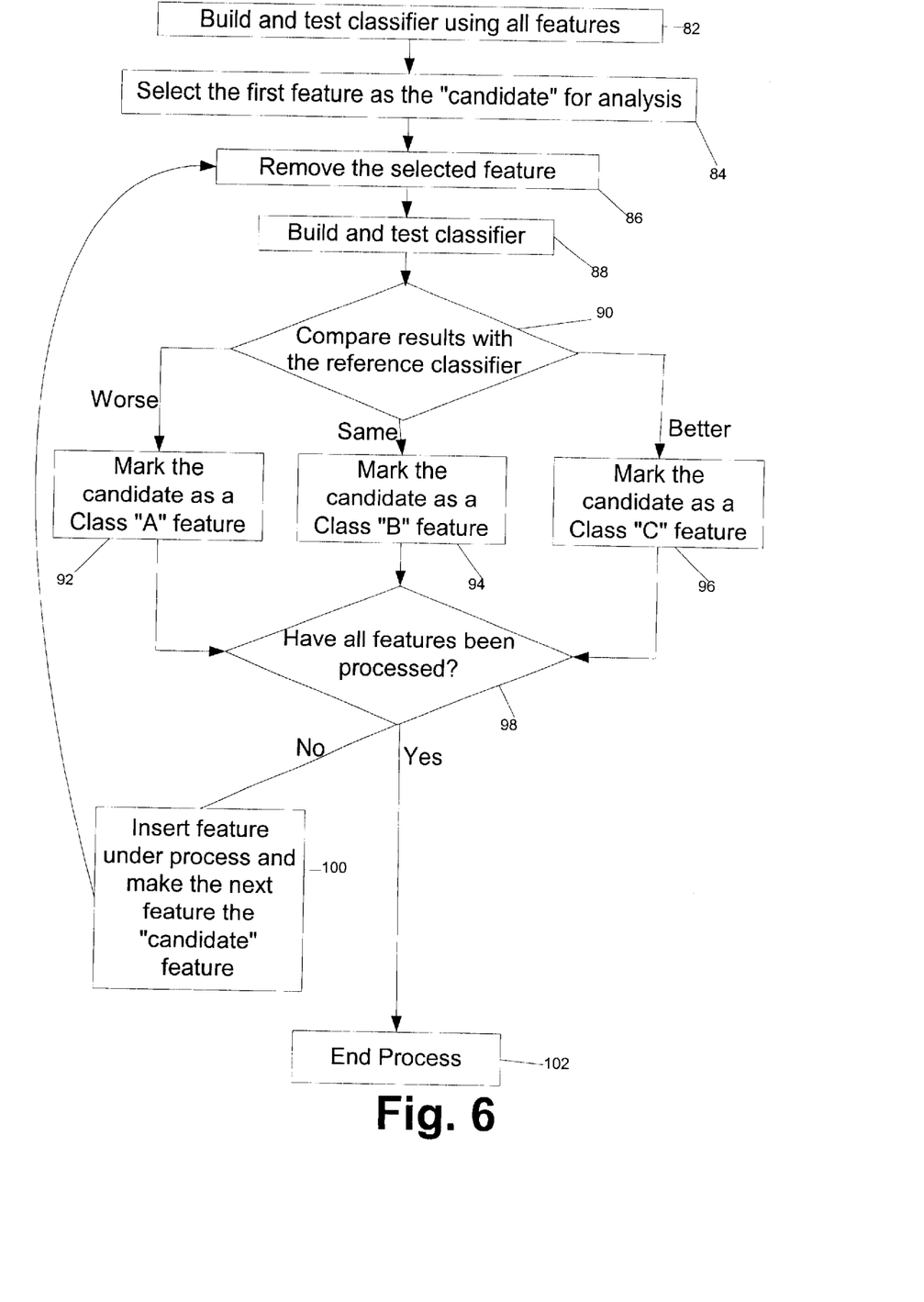
FIG. 6 is the block diagram of the post-training feature analysis process.

The process for evaluating the effectiveness of new features is distinct from the process of creating new features. FIG. 6 illustrates the process by which the utility of an individual feature can be evaluated. FIG. 6 is a block diagram of the post-training feature analysis process. The first step 82 in the process is to build and test the expert system classifier using all of the features in the feature set. This is done by building a decision tree for an expert system classifier 44 utilizing all features in the feature set. The ability to build a decision tree, and the ability to discover and utilize useful boundary values ("BV+) to distinguish different branches in the tree, is well established under existing art.

The accuracy of the aggregate feature set in the "reference classifier" can be measured by looking at test results using images of a known occupant-type classification. If the decision tree accurately predicted 100 out of 120 Adult test occupants, 68 out of 205 Child (children 6–8 years old) test occupants, and 167 out of 200 Non-Adult Seat test occupants, then those test results provide a reference point for the subsequent testing process illustrated in FIG. 6. The category of Non-Adult Seat occupants includes infant seats such as a rear facing infant seat (RFIS), front facing child seats (FFCS), and booster seats, with each seat being connected to a pre-existing seat.

After the reference classifier is built and tested 82, the first candidate feature is chosen 84 for testing to evaluate the potential predictive usefulness of the feature. A candidate feature is removed 86, with the test classifier 88 then possessing all features in the feature set except for the candidate feature removed at 86. The predictive utility of test classifier 90 is then compared to the reference classifier at 82. The comparison is done on the basis of accuracy with respect to the known occupant types tested on both the reference classifier 82 and the test classifier 90. The comparison can be done on an aggregate basis (the number of accurate predictions overall) or can be broken down by individual occupant-type classification. If the test classifier 88 performs worse than the reference classifier 82 at 90, the candidate feature 84 is given an "A" rating 92, meaning the candidate feature 84 is a good discriminator for this expert system classifier 44. If the test classifier 88 performs roughly the same as the reference classifier at 82, then the candidate feature 84 is given a "B" rating at 94. If the test classifier 88 performs better than the reference classifier 82, then the candidate feature 84 is given an "C" rating 96.

After the test classifier has been rated, the user at 98 needs to determine if all features in the reference classifier 82 have served as a candidate feature for analysis at 86. If all such features have been tested, the process ends at 102. If at least one feature remains untested, a new candidate feature is chosen at 100 and the process at 86 is repeated for the new candidate feature. The process in FIG. 6 allows a user of this invention to include only the most useful of features into the vector of features at 42 of FIG. 3. Data-mining techniques well known in the art, should be used to maximize the effectiveness of the number of test images and the number of features.

Returning to the system illustrated in FIG. 3, the vector of features 42 is then sent to the expert system classifier 44, which applies its internal rules to vector of features 42 as shown in FIG. 3. The internal rules of an expert system classifier 44 are embodied in a decision tree of the type disclosed in FIG. 5. Although classification types can be both added and deleted, the preferred embodiment contains the following seven classification types:

1. Adult
2. Child (between 6–8 years old)
3. Rear Facing Infant Seat ("RFIS")
4. Front Facing Child Seat ("FFCS")
5. Booster Seat
6. Miscellaneous (includes empty and various size common use objects)
7. Indeterminate (none of the above).

The classification types of RFIS, FFCS, and Booster Seat can be referred to in the aggregate as Non-Adult Seat.

Expert System Decision Tree

Figure 5:
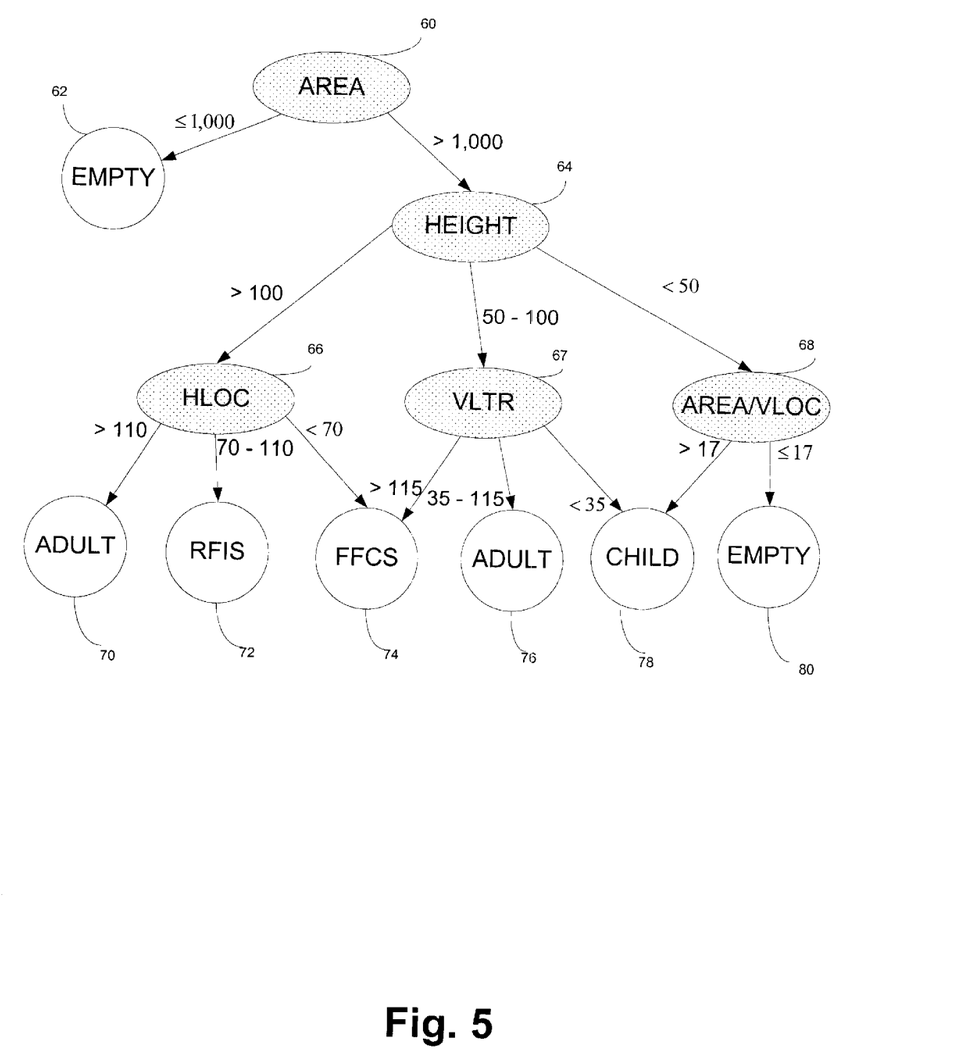
FIG. 5 is an example of a decision tree embodiment of the rule-based expert system.

The decision tree in FIG. 5 utilizes a vector of features containing five features, area of the occupant ("Area") 60, height of the occupant ("Height") 64, the horizontal location of the centroid (the waist) of the occupant ("HLOC") 66, the vertical location of the right most point of the occupant in the segmented image ("VLTR") 67, and the ratio of area of the occupant to the vertical location of the centroid of the occupant ("Area/NLOC") 68. The invention could be used with only one feature, but a greater number of features provides the possibility of greater accuracy.

The values displayed on the various branches of FIG. 5 constitute boundary values in that a boundary value ("BV") divides the feature space such that on one side of the boundary value is one or more branches of a decision tree, and on the other side of the boundary value, are one or more different branches of a decision tree. The process of setting using boundary values of the type illustrated in FIG. 5 is known in the art. The first boundary value at the top of FIG. 5 is 1,000. If the Area 60 is less then or equal to 1,000 pixels, the expert system concludes that the seat is empty. If the Area 60 is greater than 1,000 pixels, Height 64 is the next examined feature with boundary values at 50 and 100. An occupant Height 64 greater than 100 will make HLOC 66 the next examined feature. If the occupant Height 64 is between 50 and 100, VLTR 67 is the next examined feature. If the occupant Height 64 is less than 50, the ratio of occupant Area/VLOC 68 is the next examined feature. If HLOC 66 is the third examined feature, an HLOC 66 greater than 110 will result in a classification of Adult 70; an HLOC 66 between 70 and 110 will result in a classification of RFIS 72, and an HLOC 66 of less than 70 will result in a classification of FFCS 74. If VLTR 67 is the third examined feature, a VLTR 67 of greater than 115 will similarly result in a classification of FFCS 74. A VLTR 67 between 35 and 115 will result in a classification of Adult 76. A VLTR 67 of less than or equal to 35 will result in the classification of a Child 78. If Area/VLOC 68 is the third examined feature, an Area/VLOC 68 greater than 17 would similarly result in the classification of a Child 78. An Area/VLOC 68 of less than or equal to 17, would result in a classification of Empty 80.

As disclosed in FIG. 3, the expert system classifier 44 applies its internal rules to generate an occupant-type classification 48. The occupant-type classification 48 and the vector of features 42 are sent to a confidence factor extractor 46. The confidence factor extractor 46 generates a confidence factor 50. The confidence factor 50 is specific to the application of the internal rules of the expert system classifier 44 and to the vector of features 42. The method for calculating the confidence factor is described below.

Confidence Factor

A confidence factor ("CF") 50 is a probabilistic measure of the accuracy of a prediction. The confidence factor 50 ranges from a value of 0.0 to 1.0 with larger values representing a higher level of confidence, and with lower confidence factor values representing a lower level of confidence. The confidence factor 50 takes into account many factors and principles of prediction accuracy, including:

1. The accuracy of the classification decision tree as tested on occupant images where the occupant type classification was known. These results provide an a-priori probability (a-priori confidence factor or "ACF") of classification for each set of rules, and thus each expert system classifier 44 has an ACF.
2. The average of feature values ("Mean") for all features measured on the test images for each set of rules. For example, if the height of the occupant is 100, then the feature value ("FV") for the feature of height is 100, and the Mean is simply the sum of all the test image heights, divided by the number of test images.
3. The relative position of an image in the feature space, with respect to the rule thresholds and the sample mean. In other words, the relevancy of the ACF is affected by how close the Mean was to the boundary values ("BV") in the decision tree.

A-priori confidence factor

Test images are used to compute the a-priori probabilities of correct occupant-type determinations. In the first step, the total number of images and the total number of incorrect classifications (if any) are noted for each rule set. Then the following four heuristic principles are used to compute the ACF for each rule set:

1. The ACF should be higher for a rule set for which the percentage of misclassifications is lower:

ACF correct classifications/total classifications

2. ACF should also represent the volume of correctly represented classes for each rule set. In other words, the ACF should approach 100% only if the number of all correct classifications approaches infinity. For example, a rule set with 600 correct classifications out of 600 tests should have a higher ACF than a rule with only six correct classifications out of six tests even though both results represent 100% accuracy.
3. The ACF should also account for the number of classes. The higher the number of classes, the lower the ACF. For example, the ideal probability of a head in a coin toss (a two class problem) is ½ while the ideal probability of a particular card in a deck of cards (a 52 class problem) is 1/52. With the preferred embodiment containing at least 7 classes, the ideal probability in a preferred embodiment will be no higher than 1/7.
4. The ACF in the case of a one-class problem is always 100%.

In light of these four heuristics, the ACF is computed as:

ACF =(Correct Classifications+1)/(Total Classification"Total Number of Classes)

For example, if 10 correct classifications were made out of 12 total classifications, and the total number of classes was 7, then the ACF would be computed as follows:

$$ACF = \frac{(10+1)}{(12+7)} = 11/19 = 0.578947$$

The relative positions of a FV, the Mean, and the BV

Figure 7:
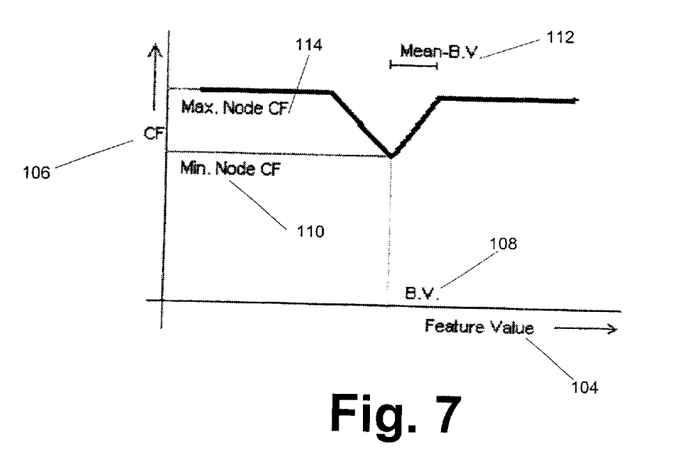
FIG. 7 shows an example of a data point confidence factor for a single feature.

The ACF is derived from tests using images of known occupant-type classifications, and therefore correctly represents the confidence with respect to those images. However, the ACF needs to be adjusted for the uncertainty associated with the actual non-test images since the classification decision tree will not have previously seen those images. The boundary thresholds or boundary values ("BV") are the numbers by which one path on a decision tree is pursued, while other branches are not. Each BV represents a generalization based on the training images. The exact location of the test image in the feature space is then used to further modify the Confidence Factor ("CF") as follows:

CF=δ×ACF where the relative position factor, δ, accounts for the distances between feature values ("FVs") to their thresholds ("BVs") and to the Mean, $\mu$, the average of all feature values in the training set images that were represented by that rule set. The confidence factor of classification ("CF") is lower if the feature is closer to the threshold and the CF is higher when substantially greater than or less then both $\mu$ and BV. FIG. 7 illustrates the basic principle that the closer to the BV 108, the lower the CF 106, and that at exactly on the BV 108, CF is at its minimum node 110. CF is at maximum 114 when the FV 104 is furthest from the BV 108, which is the same thing as saying the further the system is from a "close call" the greater the probability that a particular occupant type classification is accurate.

The relative position factor, δ, depends on the relative distance between an FV and the corresponding $\mu$ and BV. A minimum relative position factor $\delta_{min}$ means that all FV's are equal to their corresponding BV's. For example, if a rule is defined by Height>42 and HLOC<=160 and Area>11819, then the δ is at its minimum if height=42, HLOC=160 and Area=11820. Conversely, δ is at its maximum, $\delta_{max}$, when FV either substantially exceeds $\mu$ (when $\mu$>BV), or when FV is substantially less than the $\mu$ (when $\mu$<BV). The $\delta_{min}$ is further normalized to account for the variation in the number of boundary decisions (BD) in various rule sets.

In the preferred embodiment of the confidence factor, the δ is varied linearly with the distance between the boundary threshold (BV) and the sample mean ($\mu$) as shown at 112. The graph in FIG. 7 further illustrates the variation in δ at each rule or feature in a set where FV 104 is the feature value of a data point (for example, if the feature is height, the feature value is the height of the occupant), BV 108 is the boundary value threshold between two or more occupant type classifications on a decision tree (such as the decision tree disclosed in FIG. 3), and $\mu$ is the mean feature value for all the data points in the test images. The ρ is defined as the range of δ from $\delta_{min}$ to $\delta_{max}$ and controls the resolution of CF because ρ incorporates the size of the "grey area" surrounding the BV.

$$\rho = \delta_{max}^{1/BD} - \delta_{min}^{1/BD}$$

The expert system classifier will have a variable number of rules in the rule-sets representing each occupant classification type. The relative position factor at each rule, $\delta_R$, accounts for the relative position at that boundary decision:

$$\delta_R = \min\{\delta_{min}^{1/BD} + \rho^*(FV\text{-}BV/\mu\text{-}BV), \delta_{max}^{1/BD}\}$$

For example, for a rule, Area>11819, if the FV=BV (i.e., 11819), the system will select $\delta_{min}^{1/BD}$ as its value for this rule. The confidence factor for the expert system classifier 44 must be based on the relative distance at each rule of the entire rule-set in the expert system classifier 44. In the equation below, "BD" represents the number of rules in the rule set for t he expert system classifier 44.

$$\delta = \text{Product of all } \delta_R = \prod_{R=1}^{BD} \delta_R$$

For example, for a rule-se t with three rules and assuming all FVs equal their respective BVs, each rule will have $\delta_{min}^{1/3}$ and the product will result in $\delta_{min}$. Similarly, for a rule-set with only one rule and FV=BV, the relative position factor will be the same, i.e., $\delta_{min}$. As FVs move away from their respective BVs, the relative position factor increases linearly until its maximum value of $\delta_{max}$, when every FV equals its respective $\mu$.

The CF of the prediction is given by;

$$CF = \delta \times ACF$$

Figure 8:
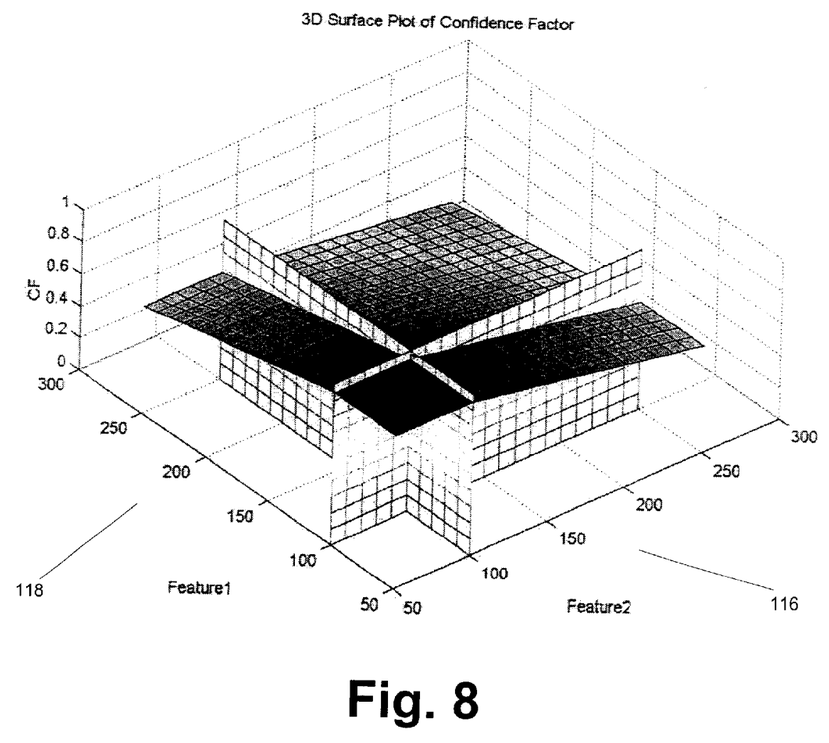
FIG. 8 shows a surface plot of an example of a data point confidence factor for two features.

The variation in CF for a rule set with only one condition, a depth of one, will follow the linear plot given in FIG. 7. FIG. 7 shows that a confidence factor (CF) 106 is at its minimum 110 when a feature value (FV) 104 is equal to the boundary value (BV) 108 and that CF is higher when FV 104 is further from the BV 108. The variation in CF for a rule set with two conditions, a depth of two, is depicted in FIG. 8. Depths of three or greater cannot easily be shown in a similar graphical manner, but the preferred embodiment of the invention utilizes an entire library of different features and numerous boundary values.

As illustrated on FIG. 3, both the occupant-type classification 48 and the confidence factor 50 are sent to the airbag controller 36. The airbag deployment system can either allow deployment, preclude deployment, or modify its deployment conditions on the basis of the occupant-type classification 48 and the confidence factor 50.

Embodiments with Multiple Expert Systems

Figure 4:
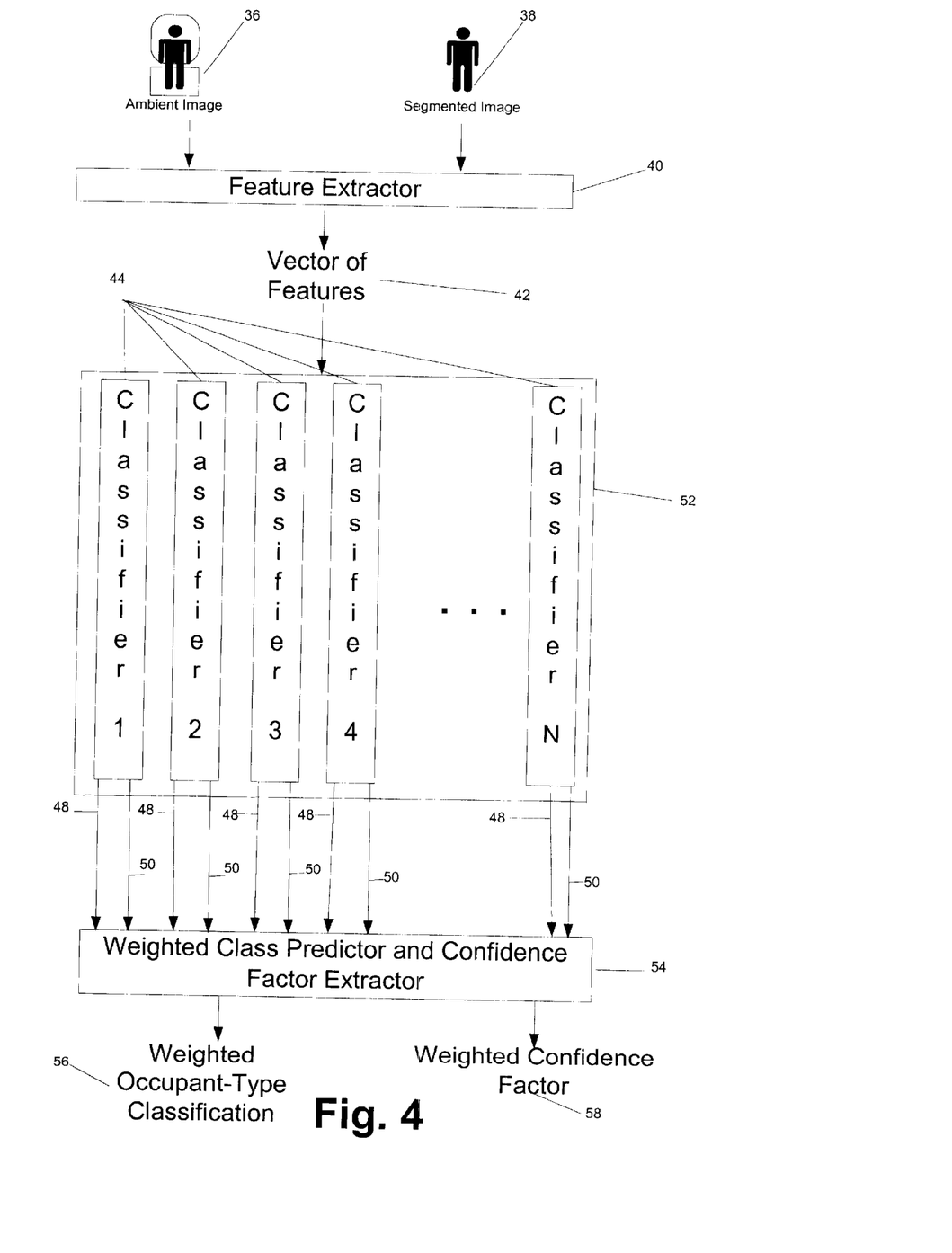
FIG. 4 shows an implementation of a multi-classifier system wherein each classifier uses the same set of features.

FIG. 4 displays an occupant classifier system 10 utilizing multiple expert system classifiers 52, the preferred embodiment of the invention. As with a single classifier system, the ambient image 36 and the segmented image 38 maybe used by the feature extractor 40 to generate the vector of features 42. In the preferred embodiment of the multi-classifier system 52, different feature sets are used for each classifier in the system. This system uses mutually exclusive sets of image features where no classifier 44 uses the same feature used by any other classifier 44. The selection of features in a multiple classifier system 52 with differing feature sets implies focusing attention on different properties of the segmented occupant image 38. Feature sets for each classifier are chosen so that enough features are available to cover the entire feature space, providing a sufficient number of boundary values to distinguish between as many occupant classification-types as possible. Redundancy in feature sets is avoided, as the purpose of using multiple features and multiple expert classifiers is to maximize coverage over the feature space. In other words, the goal is to maximize the occupant classifier system's 10 ability to distinguish between the sometimes subtle differences between occupant-type classifications. One non-preferred embodiment would use the same set of features to build each of the expert system classifiers 44. This would allow individual classifiers to focus attention on distinguishing between a subset of different occupant classification types, freeing other classifiers to focus on other subsets of different occupant classification types.

In a multiple classifier embodiment, each individual classifier 44 generates its own classification-type determination 48 and each corresponding confidence factor extractor 46 generates its own confidence factor 50. A weighted class predictor and confidence factor extractor 54 generates both a weighted occupant-type classification 56 and a weighted confidence factor 58. For each occupant-type classification 48, each confidence factor 50 associated with a determination of that same occupant-type classification 48 are added together to determine a sum total of confidence factors supporting that particular occupant-type classification. The occupant-type classification with the highest aggregate confidence factor becomes the overall weighted occupant-type classification 56. For example, if expert system classifier 1 classified the occupant as an adult with a confidence factor of 0.99 but expert system classifiers 2 and 3 classified the occupant as a child with confidence factors of 0.4 and 0.48 respectfully, the overall weighted occupant-type would be adult since 0.99 is greater than the sum of 0.4 and 0.48.

The overall confidence factor can either be weighted or non-weighted. A non-weighted aggregate confidence factor is calculated adding up the total confidence factors relating to expert system classifiers 44 that classified the occupant 18 in the same predefined occupant-type classification as the overall weighted occupant-type classification 56, and divide by the number of expert system classifiers 44 selected the overall weighted occupant-type classification. For example, if three expert classifiers each selected Adult, and the individual confidence factors were 0.9, 0.8, and 0.7, then the overall confidence factor 58 would be (0.9+0.8+0.7)/3=0.8. However, if two additional expert system classifiers chose RFIS, then the overall confidence factor for the overall classification 56 of Adult would be (0.9+0.8+0.7+0+0)/5= 0.48.

The preferred embodiment uses a weighted aggregate confidence factor wherein each expert system classifier is modified by its accuracy with respect to test data. The confidence factor for each expert system classifier is thus multiplied by a number between 0 (no images correctly identified during the test phase) or 1 (all images being correctly identified during the test phase).

From the above description, it will be apparent that the invention disclosed herein provides a novel system for classifying the occupant of a seat into one of several predefined occupant-type classifications. As will be understood by those familiar with the art, the invention may be embodied in many other specific forms without departing from the spirit or essential characteristic thereof. For example, other predictive modeling techniques might be used. In addition, other variables and features might be used during model development.

In accordance with the provisions of the patent statutes, the principles and modes of operation of this invention have been explained and illustrated in preferred embodiments. However, it must be understood that this invention may be practiced otherwise than is specifically explained and illustrated without departing from its spirit or scope.

What is claimed is:

1. An occupant classification system for use with an airbag deployment system having a seat, an occupant in the seat, a video camera for capturing a visual image of the occupant, a feature extractor, and an airbag controller, said occupant classification system comprising:
   an expert system classifier, wherein said expert system classifier receives a vector of features comprising at least one feature relating to the occupant, and wherein said expert system classifier applies an internal set of rules to the vector of features such that the occupant is identified as one of a plurality of predefined occupant-type categories; and
   a confidence factor extractor, wherein said confidence factor extractor generates a confidence factor representing the relative accuracy or inaccuracy of the occupant-type classification by said expert system classifier.

2. The occupant classification system in claim 1, wherein said predetermined occupant-type categories comprise adults, children, rear facing infant seat, front facing child seat, and booster seat.

3. The occupant classification system in claim 1, wherein the predictive qualities of each said feature is tested before it is used by said occupant classification system.

4. The occupant classification system in claim 1, wherein said vector of features is comprised of a plurality of features.

5. The occupant classification system in claim 1, wherein said occupant classification system is comprised of a plurality of said expert system classifiers.

6. The occupant classification system in claim 5, wherein all said expert system classifiers utilize the same set of said features.

7. The occupant classification system in claim 5, wherein each said expert system classifier utilizes said features unique to that said classifier.

8. The occupant classification system in claim 5, wherein a weighted voting scheme is used to generate a single occupant classification determination and a single confidence factor relating to that determination.

9. The occupant classification system in claim 1, wherein new features can be derived from old features.

10. The occupant classification system in claim 1, wherein a reference classifier is used to test and evaluate the predictive qualities of each feature used in said reference classifier before any said feature is used in said expert system classifier.

11. The occupant classification system in claim 10, wherein only those features rated average or higher at predicting occupant-types classifications have been included said set of features used by said expert system classifier.

12. The occupant classification system in claim 1, wherein data-mining techniques are used to maximize the predictive nature of said features.

13. The occupant classification system of claim 1, wherein there is only one video camera used with said occupant classification system.

14. The occupant classification system of claim 1, wherein said vector of features includes only features derived from a segmented image of the occupant.

15. The occupant classification system of claim 1, wherein said vector of features does not include a location feature.

16. The occupant classification system of claim 15, wherein said vector of features does not include a motion feature.

17. An occupant classification system comprising:
   a sensor for capturing an image of a seat area, said visual image being in a frequency range normally perceivable by the human eye;
   a feature extractor for extracting a feature of an occupant from said image and generating a vector of said feature, wherein said vector of features are derived solely from said visual image;
   an expert system classifier that receives said vector and determines a classification of the occupant; and
   a confidence factor extractor that uses said vector and said occupant-type classification to calculate a confidence level of said classification.

18. The occupant classification system in claim 17, wherein segmented image and ambient image are used to extract said features for said vector of features.

19. The occupant classification system in claim 17, wherein said expert system classifier classifies occupants into one of a plurality of predefined occupant-type classifications.

20. The occupant classification system in claim 19, wherein said classification types comprise the categories of adult, child, rear facing infant seat, front facing child seat, booster seat, miscellaneous, and indeterminate.

21. The occupant classification system in claim 17, wherein one or more features can be used to derive additional features.

22. The occupant classification system in claim 21, wherein new features are derived by adding two said features together, subtracting one said feature from another said feature value, multiplying two said features together, or the dividing one said feature by another said feature.

23. The occupant classification system in claim 17, wherein trigonometric functions can be used to derive additional features.

24. The occupant classification system in claim 17, wherein the mean value of a feature for a particular occupant-type classification can be used to derive additional features.

25. The occupant classification system in claim 17, wherein said vector of features comprises more than one feature.

26. The occupant classification system in claim 17, wherein said occupant classification system comprises more than one said expert classifier.

27. The occupant classification system in claim 26 wherein each said expert system classifier utilizes the same features.

28. The occupant classification system in claim 26, wherein no said expert system classifier uses the same feature as any other said expert system classifier.

29. The occupant classification system in claim 26, wherein a weighted voting scheme is used to generate a single overall occupant-type classification and a single overall confidence factor relating to said overall occupant-type classification.

30. The occupant classification system in claim 17, wherein reference classifiers are used to grade the usefulness of each said feature in said expert system classifier.

31. The occupant classification system in claim 30, wherein all features have been evaluated for effectiveness in generating accurate occupant-type classifications, and only said features rated average or higher are included in said expert system classifier.

32. The occupant classification system of claim 17, wherein there is only one said sensor.

33. The occupant classification system of claim 32, wherein said sensor is a video camera.

34. The occupant classification system of claim 17, wherein said vector of features is derived from a segmented image of the occupant.

35. The occupant classification system of claim 34, wherein said vector of features does not include a motion feature and a location feature.

36. An occupant classification system comprising:
a video camera for capturing an ambient image of a seat area and a segmented image of an occupant;
a feature extractor that receives said ambient image and said segmented image from said video camera and extracts said ambient image and said segmented image into a vector of features comprising at least one feature;
an expert system classifier that receives said vector of features and uses internal rules embodied in a decision tree to classify the occupant of said seat area into one of a plurality of predefined occupant-type classifications comprising adult, child, and non-adult seat; and
a confidence factor extractor that receives said occupant-type classification and said vector of features and determines the confidence level for the classification of said occupant.

37. The occupant classification system in claim 36, wherein more than one feature is used by said expert system classifier and more than one said expert system classifier is used by said occupant classification system, with each said expert system classifier contributing to a single overall occupant-type classification determination, and wherein each said expert system classifier is accompanied by one said confidence factor extractor, wherein each said confidence factor extractor contributes to a single overall confidence factor relating to said single overall occupant-type classification determination.

38. The occupant classification system of claim 36, said system comprising one said video camera.

39. The occupant classification system of claim 36, wherein said video camera does not capture an infrared image of said occupant.

40. The occupant classification system of claims 36, wherein said vector of features does not include a motion feature and a location feature.

41. A method for associating a predetermined occupant-type classification to an occupant image, comprising the steps of:
applying a decision tree utilizing different features and boundary values for those features leading to occupant-type classification determinations, wherein all said features are derived from the occupant image; and
extracting a confidence factor based on past performance of the decision tree.

42. The method in claim 41, comprising the additional prior step of including only those features which have been tested with regard to their utility in accurately predicting occupant type classifications.

43. The method in claim 41, comprising the step of utilizing multiple decision trees and generating one weighted occupant-type classification and one overall confidence factor.

44. The method in claim 43, comprising the step of utilizing one overall weighted confidence factor.

45. The method of claim 41, further comprising: capturing visual images of the occupant with a video camera.

46. The method of claim 45, wherein there is only one video camera.

47. The method of claim 41, wherein said vector of features does not include an occupant location and an occupant velocity.

48. The method of claim 41, further comprising: conducting a test to determine which features should be included in the vector of features.

* * * * *